United States Patent
Thomas et al.

(10) Patent No.: US 11,377,109 B2
(45) Date of Patent: Jul. 5, 2022

(54) METHOD FOR PERFORMING SHIFTS IN A MOTORCYCLE GEARBOX

(71) Applicant: Bayerische Motoren Werke Aktiengesellschaft, Munich (DE)

(72) Inventors: David Thomas, Munich (DE); Peter Wolff, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 738 days.

(21) Appl. No.: 15/994,899

(22) Filed: May 31, 2018

(65) Prior Publication Data
US 2018/0273043 A1 Sep. 27, 2018

Related U.S. Application Data

(63) Continuation of application No. PCT/EP2016/078374, filed on Nov. 22, 2016.

(30) Foreign Application Priority Data

Dec. 1, 2015 (DE) ...................... 10 2015 223.899.7

(51) Int. Cl.
*B60W 30/19* (2012.01)
*F16H 63/50* (2006.01)
(Continued)

(52) U.S. Cl.
CPC ............ *B60W 30/19* (2013.01); *B60W 10/02* (2013.01); *B60W 10/06* (2013.01); *B60W 10/11* (2013.01);
(Continued)

(58) Field of Classification Search
CPC .... F16H 63/502; F16H 63/18; F16H 61/0403; F16H 61/32; F16H 2061/0474;
(Continued)

(56) References Cited

U.S. PATENT DOCUMENTS 5,024,113 A * 6/1991 Ito ........................ B60K 17/04
 123/179.1
5,058,013 A * 10/1991 Iwatsuki ........... B60W 30/1819
 701/101
(Continued)

FOREIGN PATENT DOCUMENTS

CN 103608231 A 2/2014
DE 103 02 051 A1 8/2004
(Continued)

OTHER PUBLICATIONS

International Search Report (PCT/ISA/210) issued in PCT Application No. PCT/EP2016/078374 dated Jan. 24, 2017 with English translation (seven (7) pages).
(Continued)

*Primary Examiner* — Roger L Pang
(74) *Attorney, Agent, or Firm* — Crowell & Moring LLP

(57) ABSTRACT

A method for changing between a multiplicity of discrete transmission ratio stages in a motorcycle gearbox is provided. In response to a shift demand, during the torque-transmitting connection of a drive shaft of the drive machine to a gearbox input shaft, a gear-selection drum of the transmission is rotatable from a first shifting position to an intermediate position which is situated between the first and a second shifting position, before shifting to the second shift position. In the intermediate position, no drive torque can be transmitted from the gearbox input shaft to a gearbox output shaft. During the gear selection drum movement from the first shifting position and the intermediate position, the drum may be rotated to a rest position in which drive torque can be transmitted from the gearbox input shaft to a gearbox output shaft.

5 Claims, 2 Drawing Sheets

(51) Int. Cl.
 *F16H 61/04*     (2006.01)
 *F16H 63/18*     (2006.01)
 *F16H 61/32*     (2006.01)
 *B60W 10/02*     (2006.01)
 *B60W 10/06*     (2006.01)
 *B60W 10/11*     (2012.01)
 *B62K 11/00*     (2006.01)

(52) U.S. Cl.
 CPC ......... *F16H 61/0403* (2013.01); *F16H 61/32* (2013.01); *F16H 63/18* (2013.01); *F16H 63/502* (2013.01); *B60W 2300/36* (2013.01); *B60W 2510/1005* (2013.01); *B60W 2520/10* (2013.01); *B60W 2520/105* (2013.01); *B60W 2540/10* (2013.01); *B60W 2540/12* (2013.01); *B60W 2710/021* (2013.01); *B60W 2710/0666* (2013.01); *B60W 2710/1005* (2013.01); *B62K 11/00* (2013.01); *F16H 2061/0474* (2013.01); *F16H 2306/44* (2013.01); *F16H 2306/46* (2013.01)

(58) Field of Classification Search
 CPC .. F16H 2306/44; F16H 2306/46; F16H 61/04; B60W 10/06; B60W 10/02; B60W 10/11; B60W 30/19; B60W 2300/36; B60W 2510/1005; B60W 2520/10; B60W 2710/021; B60W 2710/0666; B60W 2710/1005; B60K 11/00
 See application file for complete search history.

(56) References Cited

U.S. PATENT DOCUMENTS

| | | | | |
|---|---|---|---|---|
| 5,168,776 A | * | 12/1992 | Otsubo | B60W 10/06 477/106 |
| 5,239,894 A | * | 8/1993 | Oikawa | B60W 10/06 477/107 |
| 5,456,643 A | * | 10/1995 | Yamamoto | B60W 10/06 477/110 |
| 8,328,686 B2 | * | 12/2012 | Kobayashi | F16H 61/061 477/79 |
| 10,385,968 B2 | * | 8/2019 | Takahashi | F16H 61/70 |
| 2005/0029024 A1 | * | 2/2005 | Takami | B60L 58/12 180/65.235 |
| 2006/0211536 A1 | | 9/2006 | Guggolz et al. | |
| 2007/0243973 A1 | | 10/2007 | Minami | |
| 2014/0088847 A1 | | 3/2014 | Abdul-Rasool et al. | |
| 2015/0329011 A1 | * | 11/2015 | Kawai | B60L 50/51 701/22 |
| 2018/0178805 A1 | * | 6/2018 | Nakagawa | B60W 30/18109 |
| 2019/0309827 A1 | * | 10/2019 | Kittaka | F16H 3/091 |

FOREIGN PATENT DOCUMENTS

| | | |
|---|---|---|
| DE | 10 2011 086 243 A1 | 5/2013 |
| EP | 1 790 546 A1 | 5/2007 |

OTHER PUBLICATIONS

German-language Written Opinion (PCT/ISA/237) issued in PCT Application No. PCT/EP2016/078374 dated Jan. 24, 2017 (six (6) pages).

German-language Office Action issued in counterpart German Application No. 10 2015 223 899.7 dated Aug. 17, 2016 (six (6) pages).

Chinese-language Office Action issued in counterpart Chinese Application No. 201680050827.0 dated Dec. 28, 2018 with English translation (16 pages).

* cited by examiner

METHOD FOR PERFORMING SHIFTS IN A MOTORCYCLE GEARBOX

CROSS REFERENCE TO RELATED APPLICATIONS

This application is a continuation of PCT International Application No. PCT/EP2016/078374, filed Nov. 22, 2016, which claims priority under 35 U.S.C. § 119 from German Patent Application No. 10 2015 223 899.7, filed Dec. 1, 2015, the entire disclosures of which are herein expressly incorporated by reference.

BACKGROUND AND SUMMARY OF THE INVENTION

The invention relates to a method for performing shifts in a motorcycle gearbox.

Methods for the automated or automatic shifting of a motorcycle gearbox are generally known, in particular from EP 1 790 546 A1. Gearboxes with automatic or automated shifting are increasingly employed in motorcycles, in particular to raise the level of comfort and safety. Gearboxes that have multiple shafts with parallel axes are used in motorcycles, wherein gear pairs are arranged on said axis-parallel shafts to transmit force and can be connected to gear shafts via shifting elements and/or coupling elements in a way that conveys torque. To actuate these shifting elements, at least one rotatable shifting shaft or gear-selector drum is provided, the rotation of which from a first position into a second position causes a gear change in the gearbox from the nth to the n+1th gear or vice versa, although the "first" position should not be understood to indicate 1st gear; rather, the first position describes an initial state.

If a gearbox of this type is automated, then the operating sequences that have heretofore been carried out by the driver are automated and/or performed by actuators and a process that controls them. For a shifting operation, this means that the internal combustion engine is relieved of its load in order to prevent the motor from over-revving. The transmission of force between the internal combustion engine and the gearbox is interrupted by a separation clutch, which is configured as a starting element. In the now load-free gearbox, the desired gear is engaged by the rotation of the gear-selector drum from its starting position into another discrete position. The clutch is then re-closed, and lastly the internal combustion engine is accelerated again by building up drive torque.

EP 1 790 546 A1 proposes a method for shifting a motorcycle gearbox in which the clutch disposed between the internal combustion engine and the gearbox is opened and closed for the shifting operation.

A problem addressed by the invention is that of indicating a method for shifting a motorcycle gearbox in a way that improves operational safety.

The shifting method of the present invention is provided for changing transmission stages in a motorcycle gearbox. This gearbox has a multitude of gears, preferentially five or more gears, preferably six or more and especially preferably seven or more. Within the meaning of the invention, a gear is understood to be a discrete transmission stage, and a transmission stage especially describes a particular speed ratio of a gearbox input shaft to a gearbox output shaft. The gearbox input shaft is preferentially understood to be the gearbox shaft onto which driving power of a driving motor can be transmitted, and a gearbox output shaft is preferentially understood to be the shaft from which the driving power is relayed to a wheel drive, such as preferentially a traction drive or preferably a cardan shaft drive.

In particular, motorcycle gearboxes are sequentially operable and/or shiftable gearboxes. To this end, a motorcycle gearbox that can be shifted using the method according to the invention comprises a gear-selector drum, which can be rotated by a shift actuator to activate these transmission stages or gears. The gear-selector drum is rotatably mounted, and when the gear-selector drum is rotated into discrete shifting positions, clutch mechanisms are activated and/or actuated in particular by means of shift forks, which can be connected to the gear-selector drum or can be activated by it.

A clutch mechanism is preferentially understood to be a mechanism for selectively establishing a torque-transmitting connection between a toothed wheel or sprocket wheel and a gearbox shaft or between two gearbox shafts. A clutch mechanism for establishing this connection preferentially has a frictional engagement element, a positive-locking element or both. More preferentially, a clutch mechanism is configured as a clutch or brake, preferentially with friction linings, preferentially with a drum or multi-plate structure or preferably with a conical structure.

Further preferentially, a clutch mechanism is configured as a synchronization device, which first establishes a frictional connection and then a positively locking connection. Also preferentially, the clutch mechanism has a shifting claw or is preferably configured as a sliding sleeve. Clutch mechanisms of this type are known from the prior art. What clutch mechanisms such as these have in common is, in particular, that a certain distance must first be bridged when they are actuated. In a multi-plate clutch, for example, the air gap must first be bridged before any torque can be transmitted.

Further preferentially, the driving power from the driving engine, especially from an internal combustion or electric engine, can be transmitted by a selectively shiftable starting element. Preferentially, a starting element is understood to be a system with which the transmission of driving power from the driving engine to the gearbox input shaft can be selectively interrupted, particularly when the vehicle is at a standstill. Preferentially, a starting element is configured as a torque converter and preferably as a clutch, especially a friction clutch, particularly preferably as a multi-plate clutch.

As explained, individual gears or transmission stages of the motorcycle gearbox are activated by turning the gear-selector drum to different, predeterminable rotational positions. Preferentially, the gear-selector drum can be rotated into a discrete first shifting position in which a first transmission stage is activated (nth gear). Preferentially, this shifting stage remains activated, or put another way the gear remains engaged, in particular until the gear-selector drum has been rotated out of this first shifting position by a particular amount. Further preferentially, the gear-selector drum can be rotated at least another or a further discrete shifting position, in which another transmission stage (n+1 or n−1th gear) is activated.

The method for changing the transmission stages for the motorcycle gearbox described above comprises at least the following steps:

identifying a shift request;

maintaining the torque-transmitting connection for transmitting the drive torque; in particular a clutch mechanism, which is arranged between a driving engine and the motorcycle gearbox that is to be controlled, remains closed;

once the shift request has been identified and a maintained torque-transmitting connection has been established, the drive torque of the internal combustion engine can additionally be reduced; in particular, it is thereby possible that the gear-selector drum, which is normally held in the first shifting position as a result of the drive torque, can be moved more easily;

moving the gear-selector drum from the first shifting position into an intermediate position, which lies between the first and the further shifting position in the rotational direction of the gear-selector drum, wherein it is not possible to transmit drive torque from the gearbox input shaft to a gearbox output shaft in this intermediate position;

alternatively, the drive torque, which can be provided by the driving engine, can be reduced after the intermediate position has been reached or at the same time;

moving the gear-selector drum out of the intermediate position into the further shifting position and thereby activating the further transmission stage.

Preferentially, the drive torque of the internal combustion engine is regulated as a function of the position of the gear-selector drum. According to a first alternative, the drive torque of the internal combustion engine is reduced when the gear-selector drum has reached the intermediate position, or according to another alternative, this occurs before the gear-selector drum is moved into this intermediate position. Reducing the drive torque is understood here in this context to mean that the torque that can be provided by the internal combustion engine is reduced; in particular the amount of fuel supplied is clearly reduced, such as by reducing the size of the opening in a throttle valve or reducing the injection volume. By moving the gear-selector drum into the intermediate position, the function of a starting clutch in particular, which is arranged between the internal combustion engine and the motorcycle gearbox and which is actuated during each gear shift of the gearbox in known gearboxes, is replaced by the described method for controlling the gear-selector drum.

Further preferentially, the drive torque of the internal combustion engine is increased again, preferably before the gear-selector drum has reached the further shifting position, i.e. before the further transmission stage is activated, preferentially shortly before this further shifting positon is reached. In the context of the invention, the phrase "shortly before the further shifting position" is reached refers to the angle of rotation of the gear-selector drum. Preferentially, the drive torque is, relative to the angle of rotation of the gear-selector drum, increased again 15° or less before said gear-selector drum has reached the further shifting position, preferably 7.5° or less, especially preferably 3° or less and most especially preferably 1.5° or less; and further preferentially, the drive torque is increased at least substantially simultaneously with the gear-selector drum reaching the further shifting position.

It is possible to achieve an especially safe shifting behavior in particular by coupling the drive torque, or available drive torque, and the position of the gear-selector drum in this way.

Preferentially, the shift request can be predefined by an actuation device, in particular by a foot pedal or preferentially a selector switch that is actuated by hand. Further preferentially, driving parameters are evaluated, in particular the input speed, preferentially of the gearbox input shaft, and a data processing system, preferentially a control system, automatically predefines a shift request based on these driving parameters.

Preferentially, the gear-selector drum is turned to an intermediate position after the shift request has been recognized with the starting element closed; the drive torque which can be output by the internal combustion engine is preferentially reduced during this rotation of the gear-selector drum. Preferentially, the intermediate position is selected such that it is located between two shifting positions in the direction of rotation, i.e. between the shifting position in which the gear is engaged that is activated at the time when the shift request is identified (first shifting position) and the shifting position in which the gear is activated that is engaged after the change in transmission stage (other or further shifting position).

Here, the distance between these two shifting positions depends in particular upon the design of the gearbox, preferentially at least one of the plurality of shiftable transmission stages. The intermediate position is selected such that it lies between the first shifting position and the further shifting position and such that, in the intermediate position, the first transmission stage is no longer activated and the further transmission stage is not yet activated. In this state, there is, in particular, no torque being transmitted from the gearbox input shaft to the gearbox output shaft.

Preferentially, the intermediate position is located at least approximately symmetrically between the two aforementioned shifting positions. In particular due to the selection of the intermediate position, the flux of force from the driving engine, which remains coupled with the gearbox input shaft in a way that conducts torque, and the gearbox output shaft is intentionally interrupted without the starting element having to be opened for this purpose.

The drive torque of the driving machine is reduced by a control command preferentially at the same time, preferably after moving to the intermediate position and especially preferably before this. This control command makes it possible in particular to prevent the driving engine from revving up in a substantially load-free state.

Preferentially, the gear-selector drum is controlled in such a way that it remains at least temporarily in the intermediate position; after leaving the first shifting position, the gear-selector drum preferably moves at a low speed, at least in the vicinity of the intermediate position. Preferentially, a low speed is understood to be a speed of the gear-selector drum that is lower than in another area of the movement of the gear-selector drum from the first shifting position to the further shifting position. In particular, a low speed such as this makes it possible to prevent the gear-selector drum from stopping and to improve the ability to control it.

After the gear-selector drum has reached the intermediate position, the gear-selector drum is preferentially moved out of the intermediate position into the second discrete shifting position, and the further shifting stage is thus activated. Preferentially, the intermediate position can be predicted based on the mechanical actuation of the clutch mechanisms or, more preferentially, can be determined by experimentation.

This type of control during the change of transmission stages in particular makes it possible to carry out such a change without opening and closing the starting element and thus preferentially in an especially short time. More preferentially, the service life of the starting element can be extended in this way, and the operational safety of the motorcycle gearbox can thus be increased.

In a preferred embodiment, the gear-selector drum is initially moved into a rest position, preferentially before it is moved into the intermediate position and more preferentially after the shift request is identified.

Preferentially, the rest position is selected such that, relative to the rotational path of the gear-selector drum from the first shifting position to the further shift position, it lies downstream of the first shifting position and upstream of the intermediate position. In contrast to the intermediate position, it is further preferential that a drive torque can be transmitted from the gearbox input shaft to the gearbox output shaft in the rest position. Preferentially, the rest position is selected such that clearances in the mechanical actuation of the gearbox are reduced in this position. In particular, the system is pre-tensioned by moving into the rest position, since this is closer to the further shifting position than the first shifting position, but it is still possible to transmit torque via the gearbox.

With knowledge of the lever and tolerance ratios and the system capabilities, the rest position can preferentially be predicted or estimated, and the rest position can more preferably be determined by experimentation. Especially by moving into a rest position, in which the mechanical system is pre-tensioned to actuate the clutch mechanisms, the time required to change transmission stages can be shortened and the driving comfort thereby increased.

In a preferred embodiment, the shift request can be predefined manually by the driver, preferentially by a foot- or hand-actuated selector switch. Further preferentially, the shift request can be predefined by a data processing system, especially in an automatic driving mode in which the shifting stages are changed in particular on the basis of driving speed and the speeds of the driving engine. Also preferentially, further driving parameters are utilized to identify the shift request. Preferentially, these further driving parameters can include the acceleration of the vehicle, the position of the gas and/or acceleration handle, or more preferentially the position of a driving mode switch (sport, comfort, eco or the like).

Preferentially, an operating procedure for a motorcycle gearbox includes at least two shifting methods, of which one is the aforementioned shifting method according to the invention and a further shifting method is a shifting method that deviates from the first.

Further preferentially, these shifting methods are performed selectively as a function of at least one driving status parameter. A motorcycle gearbox that is especially comfortable to operate can be produced in particular by providing two different shifting methods, which can be carried out as a function of at least one driving status parameter. In the second shifting method, it can preferentially be provided that, in order to change transmission stages, the starting element in particular is opened, or preferably that the gear-selector drum cannot be placed in an intermediate position, in particular that the gear-selector drum passes over this intermediate position at a high speed so as to spend as little time as possible between the first shifting position and the further shifting position.

In a preferred embodiment, at least one of the parameters stated below is utilized to identify the driving status parameter:
acceleration input by the driver, in particular a gas handle position,
current vehicle speed,
current vehicle acceleration,
currently selected transmission stage,
type of transmission stage change, in particular upshift or downshift
brake actuation,
position of the driving mode selector switch.

In particular as a result of the dependence upon which of the at least two shifting methods is carried out, of one of the aforementioned parameters has shown that it is possible thereby to produce a motorcycle gearbox which can be shifted in an especially comfortable way.

In a preferred embodiment, the second shifting method, in particular the shifting method that does not correspond to the shifting method described above, comprises the following steps:
identifying a shift request;
maintaining a torque-transmitting connection between the drive shaft of the driving motor and the gearbox input shaft;
reducing the drive torque;
moving the gear-selector drum out of the first shifting position into the further shifting position and thereby activating the further transmission stage. Especially during this second shifting method, the gear-selector drum is moved from the first shifting position into the further shifting position without moving to the intermediate position.

Preferentially, this type of second shifting method is used in particular for so-called tractive upshifts. Tractive upshifts such as this are characterized in particular in that the vehicle is accelerated; a method such as this is further preferentially employed to achieve very short shifting times. Tests have demonstrated that, especially during tractive upshifts, the change of transmission stages can also be carried out especially quickly without moving to an intermediate position. Tractive upshifts of this type are known per se from the prior art.

In a preferred embodiment in a preferred embodiment, the gear-selector drum can first be moved into a rest position when changing transmission stage in the second shifting method too. Here, this rest position in the second shifting method corresponds to the rest position described for the shifting method according to the invention and aids in particular in acceleration during the change of transmission stages. This acceleration can be achieved in particular in that the rotational path of the gear-selector drum from the rest position to the further shifting position is shortened relative to the rotational path from the first shifting position to the further shifting position.

Preferentially, this rest position is located in the direction of rotation of the gear-selector drum between the first shifting position, i.e. the shifting position in which a drive torque can be transmitted from the gearbox input shaft to the gearbox output shaft and in which the first transmission stage is activated, and the further shifting position, in which the transmission stage that should be engaged as a result of the identified shift request is activated. In this instance, the rest position preferentially lies closer to the first shifting position relative to the rotational path of the gear-selector drum between the first shifting position and the further shifting position, and further preferentially is characterized in that a drive torque can be transmitted from the gearbox input shaft to the gearbox output shaft.

Known motorcycle gearboxes with automated shifting are configured as double clutch gearboxes, which are very complicated, or they are configured as conventional motorcycle gearboxes with a gear-selector drum, wherein the starting clutch and the position of the gear-selector drum are controlled by a control system and motorized actuators. The proposed method makes it possible to automate a conventional motorcycle gearbox with a gear-selector drum without the starting clutch having to be outfitted with an actuator for this purpose, since the interruption of the torque-transmitting connection that is necessary to change gears is implemented by moving to the intermediate position of the gear-selector drum.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
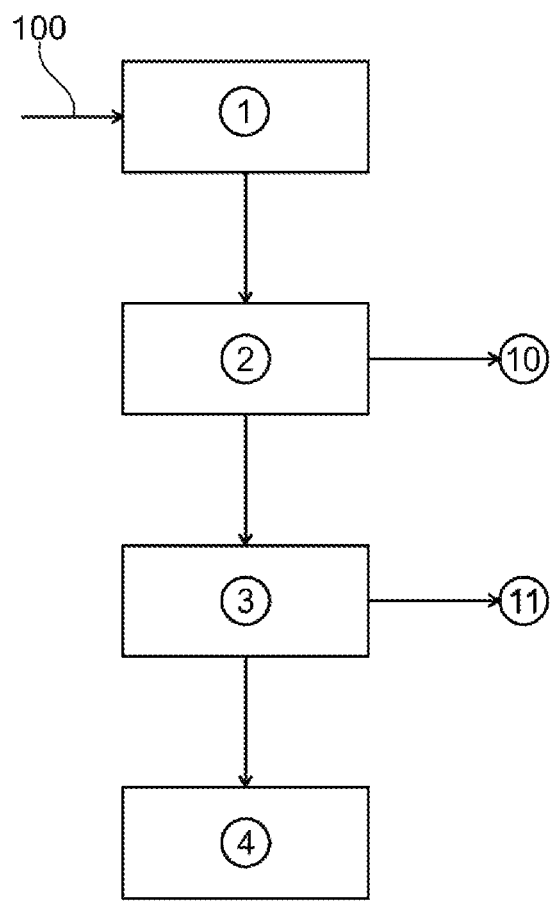
FIGS. 1A and 1B show a flow chart for a shifting method with the gear-selector drum assuming an intermediate position in accordance with an embodiment of the present invention.
Figure 1B:
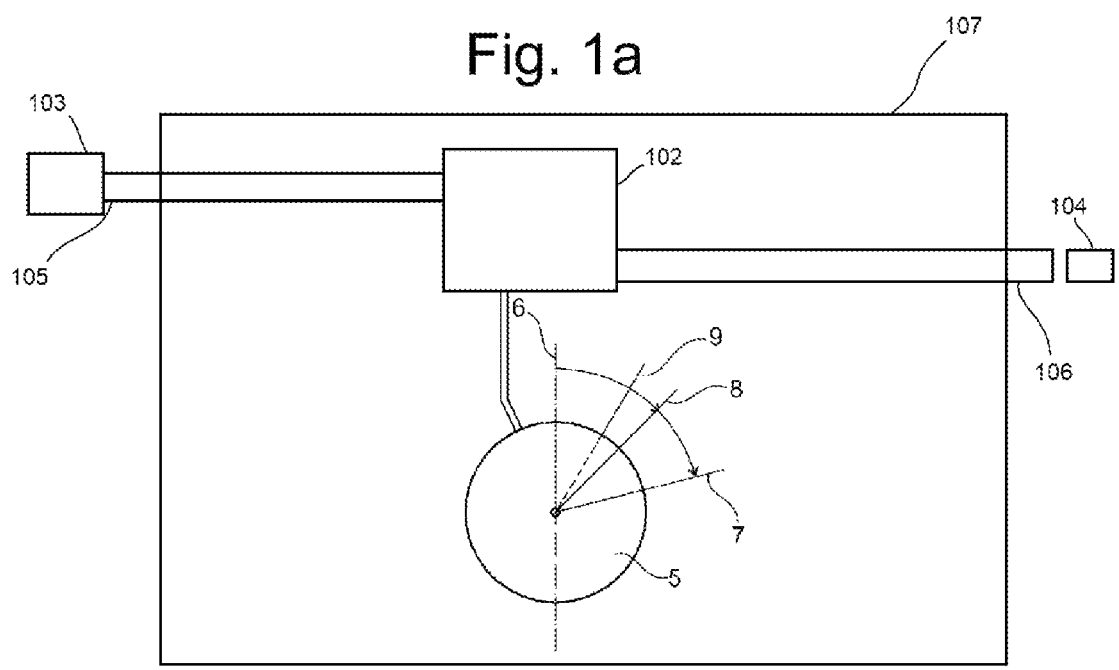

FIG. 1A shows a schematized flow chart for a shifting method as well as the angular positions a gear-selector drum 5 assumes while executing this shifting method, FIG. 1B.

If a shift request 100 is identified, then, in a first method step 1, the gear-selector drum 5 is transferred from the first shifting position 6, in which the first transmission stage is activated, to the intermediate position 8. During this transferal, the drive torque which can be output by the internal combustion engine is reduced in particular. At the same time, in the second method step 2, the torque-transmitting connection from the drive shaft of the driving engine to the gearbox input shaft is maintained and the clutch remains closed. This can occur via a specific control command 10, or else no command is given to interrupt the torque-transmitting in connection.

In the third method step 3, the drive torque of the driving engine is reduced by a control command 11 when the intermediate position 8 is reached and, in this way, the load-free over-revving of the engine is prevented, wherein this method step 3 can also be carried out immediately after the identification of the shift request 100, i.e. before the gear-selector drum 5 is moved out of the first shifting position 6. In the fourth method step 4, the gear-selector drum 5 is transferred from the intermediate position 8 to the further shifting position 7, in which the transmission stage is activated, to which a change is made due to the shift request.

As explained, the gear-selector drum 5 can initially be brought from its first shifting position 6 to a rest position 9, which is between the first shifting position 6 and the intermediate position 8 of the gear-selector drum 5 relative to the rotational path of the gear-selector drum 5. With respect to the intermediate position 8, the rest position 9 is distinguished here by the fact that a torque can be transmitted from the gearbox input shaft to the gearbox output shaft in the rest position. However, it may also be recognized in FIG. 1B that the rotational path to reach the further shifting position 7 is reduced by the rest position 9, and thus it is possible to perform especially rapid shifting operations that are particularly comfortable for the user of the motorcycle gearbox. The driving torque of the driving engine is also raised again in method step 4.

Figure 2:
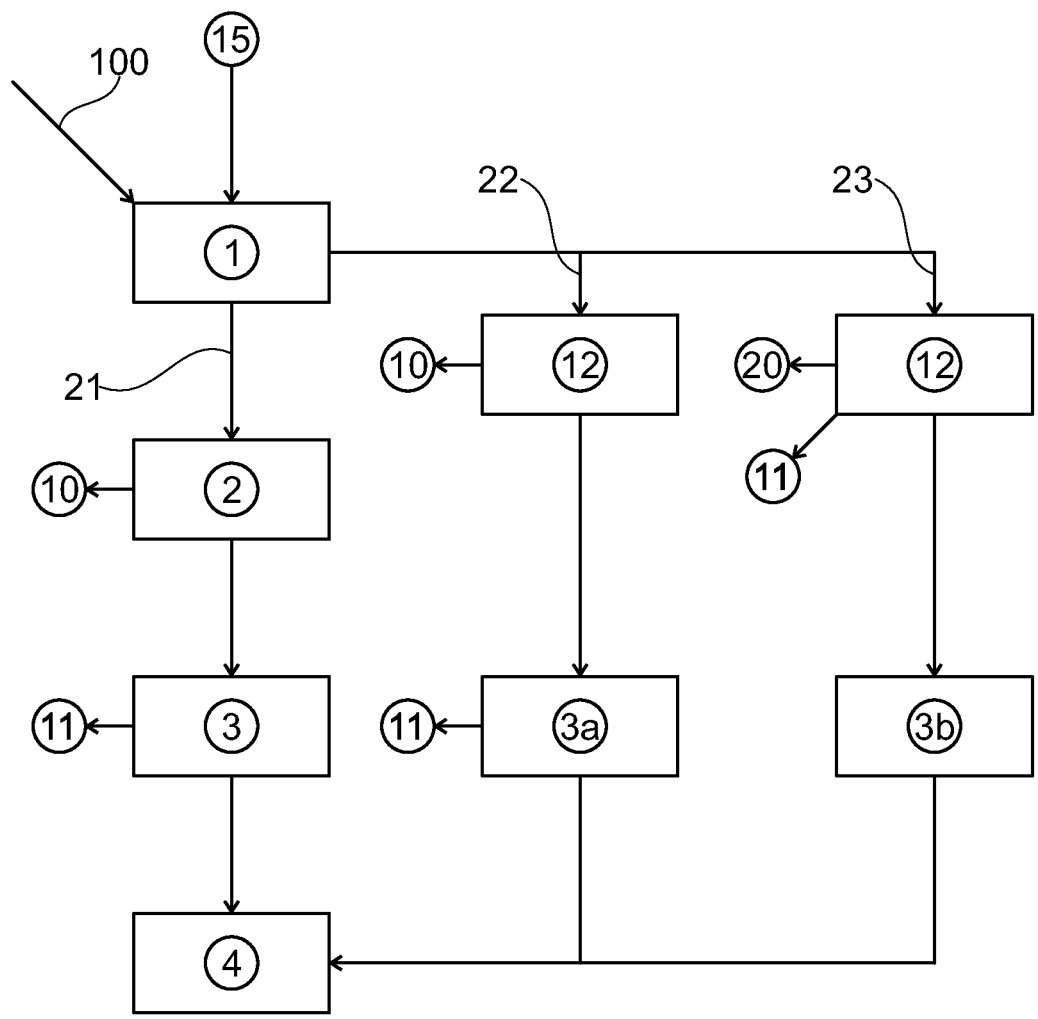
FIG. 2 shows a flow chart for an operating procedure for a motorcycle gearbox with two different shifting methods in accordance with an embodiment of the present invention, which can be carried out selectively as a function of a driving status parameter.

FIG. 2 shows a schematized flow chart for an operating method having multiple different shifting methods. In the process, the different shifting methods are performed selectively on the basis of a driving status parameter 15. One of these shifting methods the shifting method already represented in FIG. 1A and FIG. 1B, and it will not be discussed in any greater detail below.

If the path 22 is selected based on the driving status parameter 15, then the gear-selector drum (not shown) is transferred from the first shifting position into a rest position in a method step 12, and a control command 10 to maintain the transmission of torque by the starting element (not shown) is sent, or else no command is given to interrupt this torque transmission.

In a subsequent method step 3a, the gear-selector drum is moved from the rest position toward the further shifting position, and the drive torque of the driving engine can be influenced by the control command 11, i.e. preferentially increased or preferably reduced, during this movement of the gear-selector drum. With regard to an internal combustion engine, this type of influence can occur by reducing the amount of fuel supplied or by interrupting the ignition. In method step 4, the gear-selector drum is brought into the further shifting position, and the further transmission stage is thereby activated.

Moreover, a third shifting method can also be provided, which can be carried out selectively via the driving status parameter 15. In method step 12, the gear-selector drum is first placed in the rest position, and a control command 20 is sent to open the starting element, i.e. the separation clutch between the driving engine and the motorcycle gearbox. Furthermore, a control command 11 is transmitted to bring about a reduction in the drive torque of the driving engine.

In method step 3b, the gear-selector drum is moved out of the rest position toward the further shifting position. In method step 4, the gear-selector drum has reached the further shifting position, and the gear to be engaged due to the shift request is activated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A shifting method for changing transmission stages in a motorcycle gearbox having a plurality of discrete transmission stages for changing the speed ratio of a gearbox input shaft to a gearbox output shaft and a gear-selector drum rotatable by a shift actuator to select the plurality of transmission stages, wherein an input shaft of the motorcycle gearbox is configured to be coupled by a selectively shiftable clutch to a drive shaft of a driving engine to transmit a drive torque from the input shaft to an output shaft, comprising the acts of:

identifying a shift request;
    maintaining the selectively shiftable clutch in a torque-transmitting connection state for transmitting the drive torque;
    reducing the drive torque of the internal combustion engine;
    moving the gear-selector drum from a first shifting position corresponding to a first one of the plurality of discrete transmission stages into an intermediate position between the first one of the plurality of discrete transmission stages and a second one of the plurality of discrete transmission stages, the intermediate position being a position in which drive torque is not transmittable from the input shaft to the output shaft; and moving the gear-selector drum from the intermediate position to a second shifting position corresponding to the second one of the plurality of discrete transmission stages, wherein the moving the gear-selector drum from the first shifting position into the intermediate position includes moving the gear selector drum to a rest position between the first shifting position and the intermediate position before reaching the intermediate position, and the rest position is a position in which clearances in the mechanical actuation of the gearbox are reduced after the shift request is identified, and in this position drive torque being transmitted from the input shaft to the output shaft and the drive torque has not been reduced from an amount of drive torque being transmitted immediately before the shift request is identified.

2. The shifting method as claimed in claim 1, further comprising the act of:

increasing the drive torque of the internal combustion engine when the gear-selector drum has reached a position having a drum angle of rotation 15° or less before the gear-selector drum reaches the second shifting position.

3. The shifting method as claimed in claim 1, wherein the shift request is manually generated by a vehicle driver.

4. The shifting method as claimed in claim 1, wherein the shift request is automatically generated based on predefined shift request initiation parameters, the predefined shift request initiation parameters including at least one of a current vehicle speed and a rotational speed of the gearbox input shaft.

5. A motorcycle gearbox, comprising:

an input shaft configured to be selectively coupled in a torque-transmitting manner to a drive shaft of a drive engine to receive a drive torque;

and output shaft configured to receive torque transferrable from the input shaft to the output shaft via a plurality of discrete transmission stages; and a gear-selector drum configured to shift the motorcycle gearbox between the plurality of discrete transmission stages, wherein the gearbox is configured to be actuated in response to a shift request, while the input shaft is coupled in the torque-transmitting manner to the drive shaft of the drive engine and receiving the drive torque by moving the gear-selector drum from a first shifting position corresponding to a first one of the plurality of discrete transmission stages into an intermediate position between the first one of the plurality of discrete transmission stages and a second one of the plurality of discrete transmission stages, the intermediate position being a position in which drive torque is not transmittable from the input shaft to the output shaft, and moving the gear-selector drum from the intermediate position a second shifting position corresponding to the second one of the plurality of discrete transmission stages, wherein the moving the gear-selector drum from the first shifting position into the intermediate position includes moving the gear selector drum to a rest position between the first shifting position and the intermediate position before reaching the intermediate position, and the rest position is a position in which clearances in the mechanical actuation of the gearbox are reduced after the shift request is identified, and in this position drive torque being transmitted from the input shaft to the output shaft and the drive torque has not been reduced from an amount of drive torque being transmitted immediately before the shift request is identified.

\* \* \* \* \*